(12) United States Patent
Sawarkar et al.

(10) Patent No.: US 12,462,923 B2
(45) Date of Patent: Nov. 4, 2025

(54) METHOD AND SYSTEM FOR FACILITATING READING OF MEDICAL IMAGES

(71) Applicant: KONINKLIJKE PHILIPS N.V., Eindhoven (NL)

(72) Inventors: Abhivyakti Sawarkar, Swansea, MA (US); Vadiraj Krishnamurthy Hombal, Wakefield, MA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 322 days.

(21) Appl. No.: 18/269,969

(22) PCT Filed: Dec. 28, 2021

(86) PCT No.: PCT/EP2021/087735
§ 371 (c)(1),
(2) Date: Jun. 28, 2023

(87) PCT Pub. No.: WO2022/144360
PCT Pub. Date: Jul. 7, 2022

(65) Prior Publication Data
US 2024/0087724 A1 Mar. 14, 2024

Related U.S. Application Data

(60) Provisional application No. 63/133,263, filed on Jan. 1, 2021.

(51) Int. Cl.
G16H 30/40 (2018.01)
G16H 30/20 (2018.01)

(52) U.S. Cl.
CPC ............ *G16H 30/40* (2018.01); *G16H 30/20* (2018.01)

(58) Field of Classification Search
None
See application file for complete search history.

(56) References Cited

U.S. PATENT DOCUMENTS

| 6,760,468 B1 | 7/2004 | Yeh | |
| 7,529,394 B2 * | 5/2009 | Krishnan | G16H 30/40 706/14 |

(Continued)

FOREIGN PATENT DOCUMENTS

JP 2020103880 A 7/2020

OTHER PUBLICATIONS

International Search Report and Written Opinion Dated May 2, 2022 for International Application No. PCT/EP2021/087735 Filed Dec. 28, 2021.

(Continued)

*Primary Examiner* — Darryl V Dottin

(57) ABSTRACT

A system and method are provided for facilitating reading of medical images on a display. The method includes receiving a current medical image corresponding to a subject, and displaying the current medical image; performing image segmentation of the current medical image using a deep learning algorithm to identify a region of interest, and displaying an annotation on the current medical image indicating the region of interest; retrieving a previous medical image and a radiology report corresponding to a previous medical image of the subject; to extract relevant findings; performing NLP on the descriptive text to extract relevant findings, and displaying the relevant findings on the display with the current medical image; and retrieving an interactive checklist from a checklist database, including items for the user to consider when reviewing the current medical image.

20 Claims, 3 Drawing Sheets

(56) References Cited

U.S. PATENT DOCUMENTS

| | | |
|---|---|---|
| 10,002,311 B1 | 6/2018 | Garnavi |
| 2012/0130730 A1 | 5/2012 | Setlur |
| 2016/0364631 A1 | 12/2016 | Reicher |
| 2018/0181712 A1 | 6/2018 | Ensey |
| 2020/0161005 A1* | 5/2020 | Lyman .................. G16H 15/00 |
| 2020/0334809 A1 | 10/2020 | Vianu |
| 2021/0158936 A1* | 5/2021 | Rao ........................ G16H 40/67 |

OTHER PUBLICATIONS

Alkinani, et al: "Detecting Human Driver Inattentive and Aggressive Driving Behavior Using Deep Learning: Recent Advances, Requirements and Open Challenges", IEEE Access, IEEE, USA, vol. 8, Jun. 2, 2020.

* cited by examiner

METHOD AND SYSTEM FOR FACILITATING READING OF MEDICAL IMAGES

CROSS REFERENCE TO RELATED APPLICATIONS

This application is the U.S. National Phase application under 35 U.S.C. § 371 of International Application No. PCT/EP2021/087735 filed Dec. 28, 2021, which claims the benefit of U.S. Provisional Patent Application No. 63/133,263 filed Jan. 1, 2021. These applications are hereby incorporated by reference herein.

BACKGROUND

Human perception error in image interpretation is well established and can lead to under-reading, which is the largest category of radiology error where an existing finding in a medical image is simply missed. Cognitive blindness is implicated as a leading cause of under-reading. Cognitive blindness includes categories like change blindness and inattentional blindness. Inattentional blindness is defined as missing an event while being distracted or involved in a separate task. Trained and expert observers, functioning in their domain of expertise, are known to be vulnerable to inattentional blindness. The result of interpretive errors may seriously impact patient well being and treatment outcomes.

Radiologists use a variety of techniques to synthesize and finalize interpretations of radiology studies, including visual detection, pattern recognition, memory, knowledge and cognitive reasoning. These techniques are performed by the radiologists while surrounded by numerous extrinsic distractors, increasing workloads, long work hours, burdened with data and dealing with fatigue. In the face of these odds, some degree of error is likely unescapable even with experienced observers. Despite advances in imaging technology, there is no evidence of a similar improvement in the perception of human vision and brain. Humans are remarkably unaware of environmental details from one view to the next. Humans often do not detect large changes to objects and scenes, which is called change blindness. In addition, when trained experts make errors, it can potentially affect patient safety. Hence, it is essential to find technology solutions to support humans when faced with challenges that result in errors. Under-reading a radiology image make up for the kind of interpretive errors that are a cause of litigation and distress to radiologists.

SUMMARY

According to an aspect of the present disclosure, a method is provided for facilitating reading by a user (radiologist) of medical images displayed on a display including a graphical user interface (GUI). The method includes receiving a current medical image of a subject (e.g., patient), and displaying it on the display to perform an image reading by the user; performing image segmentation using a deep learning algorithm of the current medical image to identify at least one region of interest, and displaying at least one annotation on the current medical image indicating the at least one region of interest on the display; retrieving a previous medical image of the subject from a picture archiving and communication system (PACS) database; retrieving a radiology report from the PACS or radiology information system (RIS) database regarding the previous medical image, the corresponding radiology report comprising descriptive text; performing image segmentation on the previous medical image using a deep learning algorithm to extract relevant findings, and displaying the relevant findings on the display with the current medical image; performing natural language processing (NLP) on the descriptive text using a using word embedding technology to extract relevant findings, and displaying the relevant findings on the display with the current medical image; retrieving an interactive checklist from a checklist database, the interactive checklist comprising a plurality of items for the user to consider when reviewing the current medical image, and displaying the interactive checklist on the display with the current medical image, wherein the interactive checklist is modifiable by the user via the GUI for adding one or more items to the interactive checklist while preventing removal of existing items from the interactive checklist; and determining a level of distraction of the user, and providing an alert to the user when the level of distraction exceeds a predetermined threshold, and generating a report identifying how long the level of distraction exceeds the predetermined threshold.

The method may further include tracking eye movement of the user while reading the current medical image to identify areas of high focus and low focus, and determining weak spots in medical image perception by the user based on the identified areas of high focus and low focus; and implementing at least one eye tracking alert via the GUI based on the determined weak spots in medical image perception in order to improve performance and to reduce under-reading. Also, a service level agreement may be retrieved from a personal database, and the imaging study may be initially matched to the user based at least in part on a specialty of the user indicated in the service level agreement.

According to an aspect of the present disclosure, a system for facilitating reading by a user of medical images includes a display comprising a GUI for interfacing with a user; a processor in communication with the display; and a non-transitory memory that stores instructions. When executed by the processor, the instructions cause the processor to receive a current medical image of a subject and cause the current medical image to be displayed on the display for the user to perform an image reading; perform image segmentation of the current medical image using a deep learning algorithm to identify at least one region of interest, and cause at least one annotation to be displayed on the current medical image indicating the at least one region of interest on the display; retrieve a previous medical image of the subject from a PACS database; retrieve a radiology report from the PACS database or a RIS database regarding the subject, the radiology report comprising descriptive text; perform image segmentation on the previous medical image using a deep learning algorithm to extract relevant findings, and to cause the relevant findings to be displayed on the display with the current medical image; perform NLP on the descriptive text using a word embedding technology to extract relevant findings, and cause the relevant findings to be displayed on the display with the current medical image; retrieve an interactive checklist from a checklist database, the interactive checklist including items for the user to consider when reviewing the current medical image, and cause the interactive checklist to be displayed on the display with the current medical image. The interactive checklist is modifiable by the user via the GUI for adding one or more items to the interactive checklist while preventing removal of existing items from the interactive checklist.

The system may further include a camera in communication with the processor, and configured to capture eye movements of the user to determine a gaze of the user in relation to the display while reading the current medical image. The instructions may further cause the processor to identify areas of high focus and low focus based on the tracked eye movement, and to implement at least one eye tracking alert on the display based on the identified areas of low focus to improve performance and to reduce under-reading. The least one eye tracking alert may be presented on the display as scan-paths that show covered and missed areas, as scan patterns and/or as a measure of duration of distraction and idling.

The instructions, when executed by the processor, may further cause the processor to determine a level of distraction of the user, provide an alert to the user when the level of distraction exceeds a predetermined threshold, and generate a report identifying how long the level of distraction exceeds the predetermined threshold.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
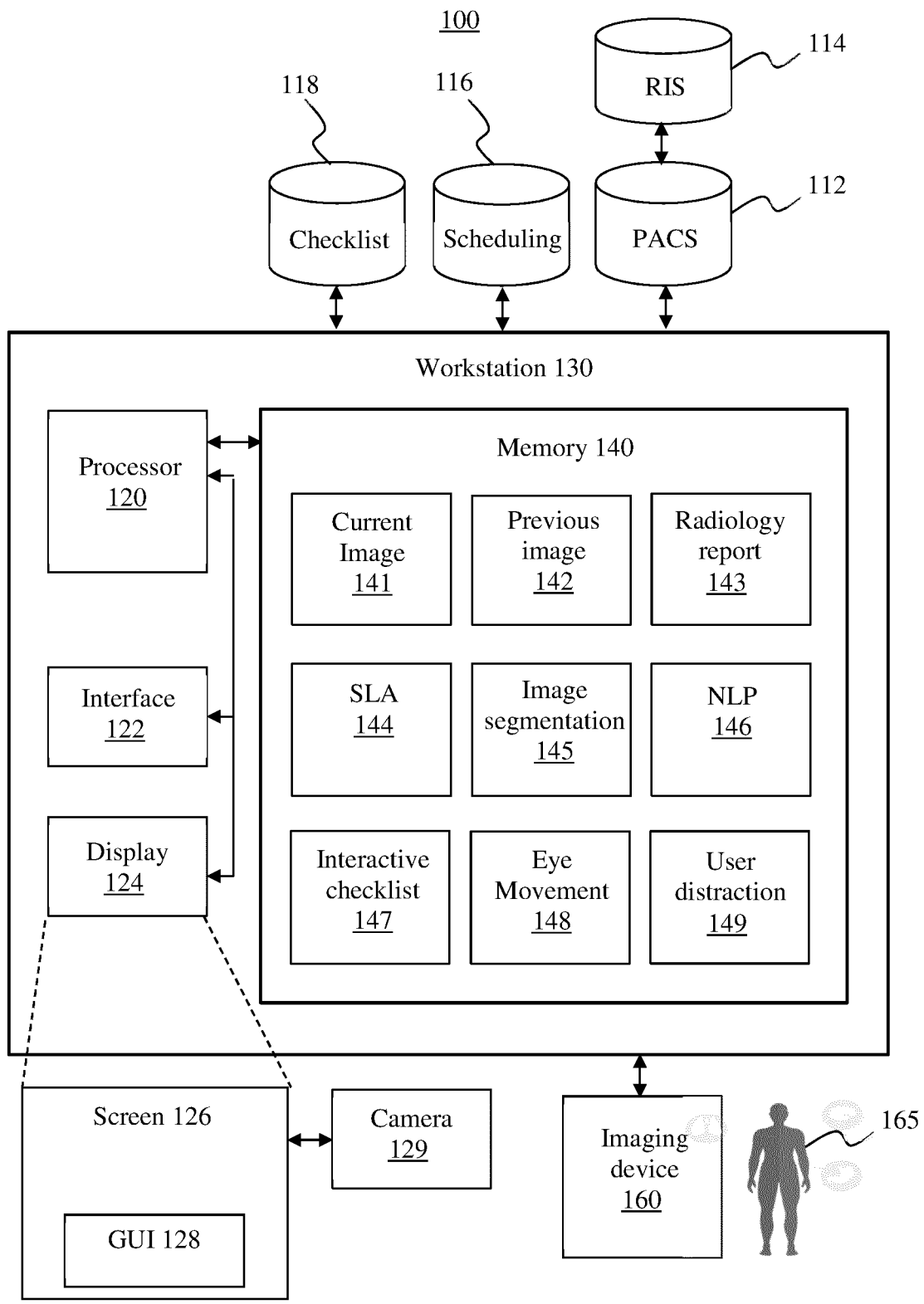
FIG. 1 is a simplified block diagram of a system for facilitating reading by a user of medical images displayed on a display viewer including a GUI, according to a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," "comprising," and/or similar terms specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, the various embodiments described herein help users (e.g., radiologists) reduce under-reading errors of medical images using techniques that bring their focus to areas of radiology studies that may otherwise go unattended and hence un-read, under-read or undermined in severity. The embodiments draw on contextual patterns and help the users with critical reminders and checklists that direct them toward more thorough examinations of the medical image and help them overcome cognitive limitations caused by distractions, fatigue, and the like, ultimately resulting in reduction of under-reading errors. The embodiments also increase efficiency in diagnostication with intelligence-augmented decision-making. The system is prescient, in that it has the ability to learn continuously and iteratively.

FIG. 1 is a simplified block diagram of a system for facilitating reading by a user of medical images displayed on a display including a GUI, according to a representative embodiment.

Referring to FIG. 1, system includes a workstation 130 for implementing and/or managing the processes described herein. The workstation 130 includes one or more processors indicated by processor 120, one or more memories indicated by memory 140, interface 122 and display 124. The processor 120 interfaces with an imaging device 160 through an imaging interface (not shown). The imaging device 160 may be any of various types of medical imaging device/modality, including an X-ray imaging device, a computerized tomography (CT) scan device, a magnetic resonance (MR) imaging device, a positron emission tomography (PET) scan device or an ultrasound imaging device, for example.

The memory 140 stores instructions executable by the processor 120. When executed, the instructions cause the processor 120 to implement one or more processes for facilitating reading by a user of medical images displayed on the display 124, described below with reference to FIG. 2, for example. For purposes of illustration, the memory 140 is shown to include software modules, each of which includes the instructions corresponding to an associated capability of the system 100.

The processor 120 is representative of one or more processing devices, and may be implemented by field programmable gate arrays (FPGAs), application specific integrated circuits (ASICs), a digital signal processor (DSP), a general purpose computer, a central processing unit, a computer processor, a microprocessor, a microcontroller, a state machine, programmable logic device, or combinations thereof, using any combination of hardware, software, firmware, hard-wired logic circuits, or combinations thereof. Any processing unit or processor herein may include multiple processors, parallel processors, or both. Multiple processors may be included in, or coupled to, a single device or multiple devices. The term "processor" as used herein encompasses an electronic component able to execute a program or machine executable instruction. A processor may also refer to a collection of processors within a single computer system or distributed among multiple computer systems, such as in a cloud-based or other multi-site application. Programs have software instructions performed by one or multiple processors that may be within the same computing device or which may be distributed across multiple computing devices.

The memory 140 may include main memory and/or static memory, where such memories may communicate with each other and the processor 120 via one or more buses. The memory 140 may be implemented by any number, type and combination of random access memory (RAM) and read-only memory (ROM), for example, and may store various types of information, such as software algorithms, artificial intelligence (AI) models, and computer programs, all of which are executable by the processor 120. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 140 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 140 may store software instructions and/or computer readable code that enable performance of various functions. The memory 140 may be secure and/or encrypted, or unsecure and/or unencrypted.

The system 100 also includes databases for storing information to be used by the various software modules of the memory 140. The databases include a PACS database 112, a radiology information system (RIS) database 114, a scheduling database 116 and a checklist database 118. The databases may be implemented by any number, type and combination of RAM and ROM, for example. The various types of ROM and RAM may include any number, type and combination of computer readable storage media, such as a disk drive, flash memory, EPROM, EEPROM, registers, a hard disk, a removable disk, tape, CD-ROM, DVD, floppy disk, Blu-ray disk, USB drive, or any other form of storage medium known in the art. The databases are tangible storage mediums for storing data and executable software instructions and are non-transitory during the time data and software instructions are stored therein. The databases may be secure and/or encrypted, or unsecure and/or unencrypted. For purposes of illustration, the PACS database 112, the RIS database 114, the scheduling database 116, and the checklist database 118 are shown as separate databases, although it is understood that all or some of these databases may be combined, and/or included in the memory 140, without departing from the scope of the present teachings.

The processor 120 may include or have access to an artificial intelligence (AI) engine, which may be implemented as software that provides artificial intelligence (e.g., a deep learning and NLP algorithms) and applies machine learning described herein. The AI engine may reside in any of various components in addition to or other than the processor 120, such as the memory 140, an external server, and/or the cloud, for example. When the AI engine is implemented in a cloud, such as at a data center, for example, the AI engine may be connected to the processor 120 via the internet using one or more wired and/or wireless connection(s).

The interface 122 may include a user and/or network interface for providing information and data output by the processor 120 and/or the memory 140 to the user and/or for receiving information and data input by the user. That is, the interface 122 enables the user to enter data and to control or manipulate aspects of the processes described herein, and also enables the processor 120 to indicate the effects of the user's control or manipulation. All or a portion of the interface 122 may be implemented by a graphical user interface (GUI), such as GUI 128 viewable on the display 124, discussed below. The interface 122 may include one or more of ports, disk drives, wireless antennas, or other types of receiver circuitry. The interface 122 may further connect one or more user interfaces, such as a mouse, a keyboard, a trackball, a joystick, a microphone, a video camera, a touchpad, a touchscreen, voice or gesture recognition captured by a microphone or video camera, for example.

The display 124, also referred to as a diagnostic viewer, may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 124 includes a screen 126 for viewing internal images of a subject (patient) 165, along with various features described herein to assist the user in accurately and efficiently reading the medical images, as well as the GUI 128 to enable the user to interact with the displayed images and features. The user is able to personalize the various features of the GUI 128, discussed below, by creating specific alerts and reminders, for example.

Referring to the memory 140, current image module 141 is configured to receive (and process) current medical image corresponding to the subject 165 for display on the display 124. The current medical image is the image currently being read/interpreted by the user (e.g., radiologist) during a reading workflow. The current medical image may be received from the imaging device 160, for example, during a contemporaneous imaging session of the subject. Alternatively, the current image module 141 may retrieve the current medical image from the PACS database 112, which has been stored from the imaging session, but not yet read by the user. Previous image module 142 receives previous medical image of the subject 165 from the PACS database 112. The current medical image and all or part of the previous medical image may be displayed, jointly or separately, on the screen 126 to enable analysis and visual comparison by the user. When displayed jointly, the previous and current medical images may be registered with one another.

Previous radiology report module 143 is configured to retrieve a radiology report from the PACS database 112 and/or the RIS database 114 regarding the subject 165. The radiology report provides analysis and findings of previous imaging of the subject 165, and may correspond to the previous medical image retrieved by the previous image module 142. The radiology report includes information about the subject 165, details on the previous imaging session, and medical descriptive text entered by the user (e.g., radiologist) who viewed and analyzed the previous medical image(s) associated with the radiology report. Relevant portions of the radiology report may be displayed on the display 124 in order to emphasize information to the user that may be helpful in analyzing the current medical image.

Service level agreement (SLA) module 144 is configured to retrieve information from SLAs of users employed by or at the facility in which the system 100 is deployed, and to match cases with appropriate users. The SLA may be stored at the SLA module 144 or in a separate database (not shown). For example, the SLA includes information regarding the training, specialties and qualifications of the various users (radiologists). Accordingly, the SLA module 144 may identify a user to perform a particular image review session by matching the type of study to the user qualifications. Alternatively, or in addition, the user reviewing the current medical image may enter identification information via the interface 122 at the start of reading the image, and the SLA module 144 enables determination of whether the user has the appropriate qualifications and permission to perform the type of image review about to be performed. Other information may be included in the SLA as well, such as length of employment of the user.

Image segmentation module 145 is configured to perform image segmentation of the current medical image (e.g., provided by the current image module 141), including execution of one or more deep learning algorithms, and to display results of the image segmentation on the display 124. The image segmentation of the current medical image using a deep learning algorithm is used to identify one or more regions of interest of the current medical image. Image segmentation is well known, and may include point detection, line detection, edge detection, thresholding, and the like, as would be apparent to one skilled in the art. Annotations may then be overlaid on the current medical image indicating the regions of interest on the display 124 in order to draw the user's attention to and evaluate them. The annotations may include various markings, such as circles and arrows, visually demarcating and/or identifying the regions of interest, as well as associated text describing the regions of interest. For example, the image segmentation module 145 may localize, mark and circle all probable lesions on the current medical image of lungs of the subject 165. This assists the user to study findings that may otherwise have been overlooked. In an embodiment, the image segmentation module 145 may be further configured to automatically measure the regions of interest identified by the segmentation.

The image segmentation module 145 is further configured to perform image segmentation of the previous medical image (e.g., provided by the previous image module 142 and/or radiology report(s) from the previous radiology report module 143), including executing the one or more deep learning algorithms, and to display results of the image segmentation on the display 124. The image segmentation of the previous image is used to extract relevant findings from the previous medical image(s).

NLP module 146 is configured to execute one or more NLP algorithms using word embedding technology, such as Bio+Clinical BERT, for example, to extract relevant findings from the text in the radiology report(s) provided by the previous radiology report module 143 by processing and analyzing natural language data. NLP is well known, and may include syntax and semantic analyses, for example, and deep learning for improving understanding by the NLP module 146 with the accumulation of data, as would be apparent to one skilled in the art. The NLP module 147 causes the extracted findings to be visually displayed on the display 124 along with the current medical image, so that the user is well informed and the current medical image reading is thorough and complete, without explicit inputs from user. All or part of the processes provided by the image segmentation module 145 and the NLP module 146 may be implemented by an AI engine, for example.

Interactive checklist module 147 is configured to retrieve an interactive checklist from the checklist database 118, and to display on the interactive checklist with the current medical image on the display 124. The checklist database 118 is prepopulated with available interactive checklists, each of which may be created from literature and/or clinical data, and is customizable. The interactive checklist may include multiple items for the user to consider in reading the current medical image, such as lists of possible diagnoses and misdiagnoses for the type of study currently being read. The interactive checklist is bidirectional in that it may be modified by the user via the GUI 128, as discussed below. For example, the user may add one or more items to the interactive checklist to assist in reading medical images in future studies. In an embodiment, the user is not able to remove items from the interactive checklist in order to maintain a set of core items for each of the interactive checklists stored in the checklist database 118.

Eye tracking module 148 is configured to track eye movement of the user while the user is reading images, and to provide indications of focus on and off the screen 126 based on the user's gaze. The eye tracking is performed using camera 129, which may be a video camera configured to capture the eye movements of the user to determine the user's gaze in relation to the screen 126. For example, when the user is looking at the screen 126, the eye tracking module 148 identifies areas of high focus and low focus based on the timing and direction of the user's gaze within the screen 126. Weak spots in medical image perception by the user are then determined based on the identified areas of low focus. The eye tracking module 148 may then provide an eye tracking alert via the display 124 to identify and bring to the user's attention the determined weak spots in the user's medical image perception in order to improve performance and to reduce under-reading. For example, a portion of the screen 126 corresponding to an area of low focus may be visually highlighted to draw the use's attention. For example, the corresponding portion of the screen 126 may flash, may be encircled by a visual annotation, may provide a blinker, or may be temporarily magnified to draw the user's gaze. In addition, the eye tracking module 148 may cause text to be displayed on the screen 126, e.g., in the form of an alert box, describing in words the portions of the screen 126 that include the areas of low focus. The eye tracking module 148 also tracks when and how long the user is looking away from the screen 126, which may be used as an indication of user distraction, discussed below.

User distraction module 149 is configured to determine a level of distraction of the user, and to provide an alert to the user when the level of distraction exceeds a predetermined threshold. In an embodiment, a distraction report may be generated identifying how long the level of distraction exceeded the predetermined threshold. The user distraction module 149 is further configured to receive information from the eye tracking module 148 regarding the direction and timing of the tracked eye movement of the user looking away from the screen 126 while the user is reading the current medical image on the display 124. The level of distraction may be based on a number of determinations, including user fatigue and the direction of the user's gaze, for example.

With regard to user fatigue, the user distraction module 149 is configured to access a scheduling database 116 in order to retrieve scheduling data for determining shift information, such as the duration of the user's shift, the amount of time into the shift the user has been working, the time of the day and how many hours the radiologist has been working on previous shifts based on login data and work schedules. Generally, the level of distraction of the user is determined to increase as the user is longer into their shift, works later in the day and/or has several previous shifts without a day off in between, based on increased fatigue. In an embodiment, the level of distraction is determined to increase the longer the user takes to read and analyze the current medical image.

With regard to the user's gaze, the distraction module 149 receives information from the eye tracking module 148 identifying when the user looks away from the screen 126 during a reading task and determines the amount of time the user is looking away each time. When the number of times the user looks away and/or length of time the user is not looking at the screen 126 exceed corresponding thresholds, an alert is provided to the user. Generally, the level of distraction of the user is determined to increase the more often and longer the user is looking away from the screen 126. The user distraction module 149 may also be configured to determine a distraction pattern based on the distracted eye movement away from the screen 126.

Figure 2:
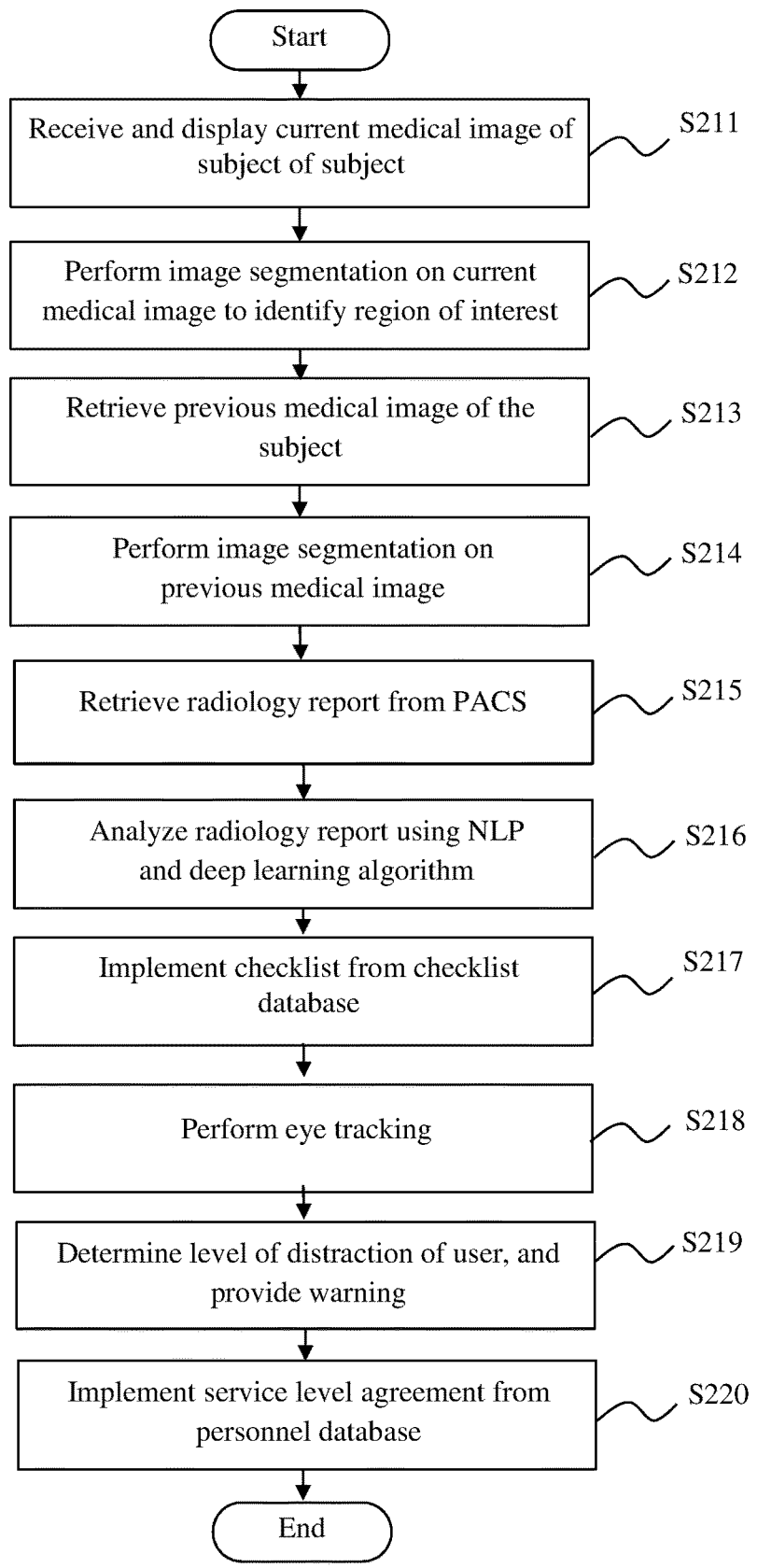
FIG. 2 is a flow diagram showing a method of segmenting facilitating reading by a user of medical images displayed on a display, according to a representative embodiment.

FIG. 2 is a flow diagram of a method for facilitating reading by a user of medical images displayed on a display including a GUI, according to a representative embodiment. The method may be implemented by the system 100, discussed above, under control of the processor 120 executing instructions stored as the various software modules in the memory 140, for example.

Referring to FIG. 2, a current medical image of a subject is received and displayed with the GUI in block S211 (e.g., by current image module 141). The current medical image may be received directly from a medical imaging device/modality, such as an X-ray imaging device, a CT scan device, an MR imaging device, a PET scan device or an ultrasound imaging device, for example. This enables the user to read the medical image while the subject is being scanned. Alternatively, or in addition, the current medical image may be retrieved from a database, such as a PACS database, for example, in which the current medical image had been stored following the imaging procedure. The corresponding medical image may be displayed on a compatible display, such as a diagnostic viewer routinely used for reading radiological studies.

In block S212, image segmentation is performed on the current medical image using deep learning, in order to identify at least one region of interest in the current medical image (e.g., by image segmentation module 145). Image segmentation with deep learning is well known and covers a wide variety of image processing that may be applied for purposes of analyzing the current medical image. Segmentation may include, for example, point detection, line detection, edge detection, thresholding, and the like, as would be apparent to one skilled in the art. In addition, annotations may be displayed overlaid on the current medical image indicating the regions of interest identified by the segmentation. The annotations visually draw the user's attention to the regions of interest, increasing chances that they will be seen and evaluated by the user. The annotations may include various markings, such as circles and arrows, visually demarcating and/or identifying the regions of interest. The annotations may also include text that describes the regions of interest. For example, the segmentation may localize, mark and circle all probable nodules, lesions or other abnormalities on the current medical image of the subject's lungs. This assists the user in identifying and studying findings that may otherwise have been overlooked. In an embodiment, the segmentation may further enable automatic measurements of the regions of interest identified by the segmentation.

The image segmentation may include semantic segmentation, for example, according to which the current medical image is segmented into portions that are related to different objects in the current medical image using a well-known deep learning model called U-Net. Generally, U-Net involves semantic segmentation that achieves fine-grained inference by making dense predictions inferring labels for every pixel in the image, so that each pixel is labeled with the class of its enclosing object or region. The image segmentation helps the user to observe and examine organ structure and anatomy contained in the current medical image, to detect one or more regions of interest in the current medical image, such as nodules, tumors, lesions or other abnormalities, to measure various features such as tissue and lesion volume in order to measure growth or decrease in lesion (or other abnormality) size in response to treatment, and to assist with treatment planning prior to radiation therapy, radiation dose calculation and the like. Image segmentation may also identify atypical presentations, rare cases and outliers, for example, which are expected to be monitored more closely, since the prevalence of under-reading is higher in these cases.

Figure 3:
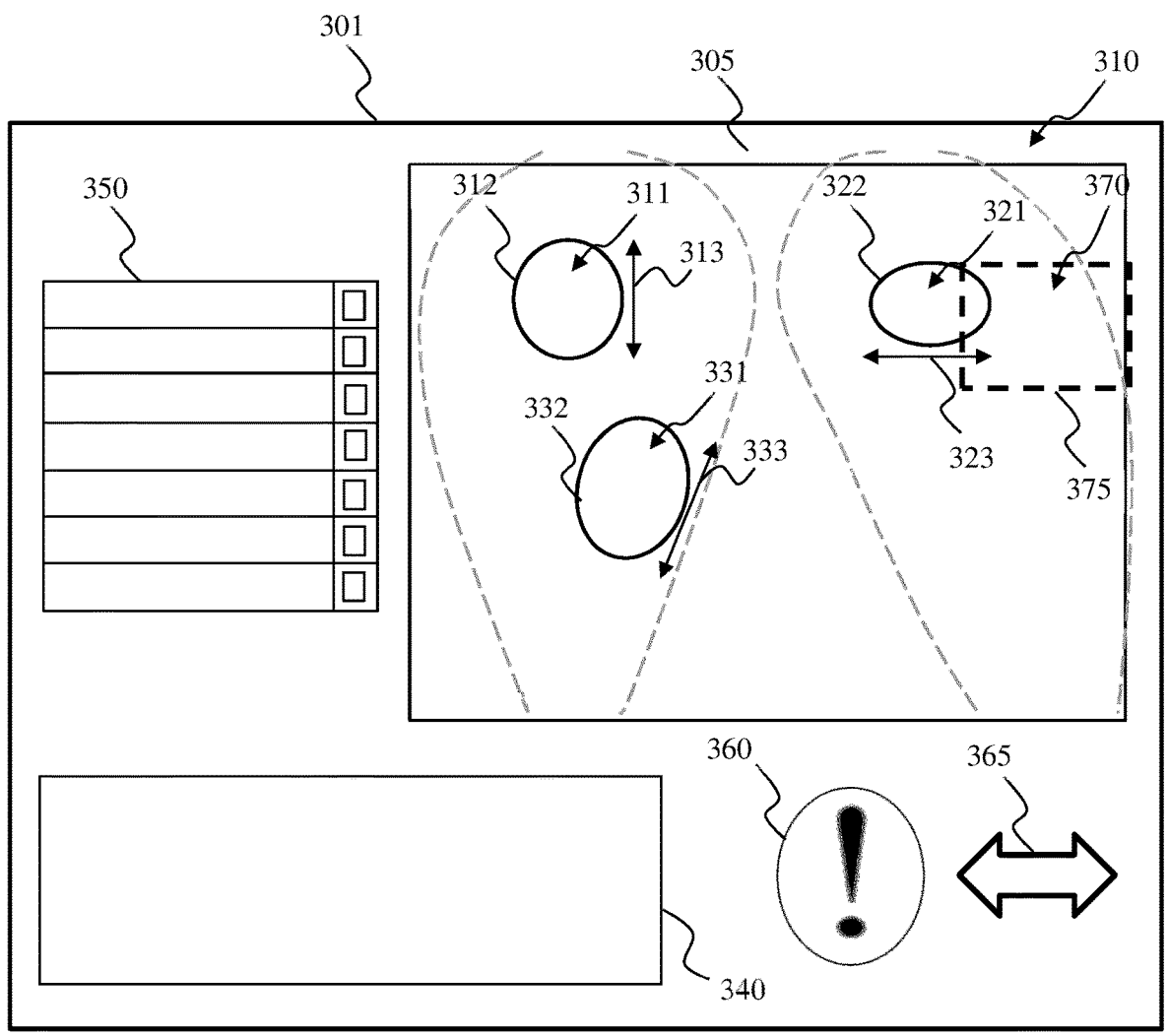
FIG. 3 is a screen shot of an illustrative GUI on a display for facilitating reading by a user of medical images according to a representative embodiment.

FIG. 3 is a screen shot of an illustrative GUI on a display for facilitating reading by a user of medical images according to a representative embodiment.

Referring to FIG. 3, GUI 301 includes an image section 305 that displays a current medical image 310 on display 300 (e.g., a diagnostic viewer). As discussed above, the current medical image 310 may have been received directly from an imaging device or otherwise retrieved from an imaging database. In the depicted example, the current medical image 310 shows lungs of the subject acquired using X-ray imaging. Further to the segmentation performed according to block S212, for example, three areas of interest corresponding to lung nodules have been automatically identified and brought to the user's attention using annotations. A first area of interest 311 is indicated by first circle 312, a second area of interest 321 is indicated by second circle 322 and a third area of interest 331 is indicated by third circle 332. Additionally, the segmentation has enabled automatic measurements of the areas of interest, which are indicated by measurement arrows and corresponding text displayed on the GUI 301. In the depicted example, the first area of interest 311 has a longest dimension of 15 mm indicated by first measurement arrow 313, the second area of interest 321 has a longest dimension of 5 mm indicated by second measurement arrow 323, and the third area of interest 331 has a longest dimension of 12.5 mm indicated by third measurement arrow 333.

Referring again to FIG. 2, a previous medical image corresponding to the subject is retrieved from an imaging data base, such as a PACS database, in block S213 (e.g., by previous image module 142). In block S214, image segmentation is performed on the previous medical image using a deep learning model, such as a U-Net model, as described above with reference to block S212 (e.g., by image segmentation module 145). Image segmentation with deep learning is well known and covers a wide variety of image processing that may be applied for purposes of analyzing the previous medical image. Further to the image segmentation, relevant findings may be extracted from the previous medical image, which findings may be displayed on the display along with the current medical image, without explicit inputs from user. The user is therefore well informed with regard to the subject's imaging history. For example, the user is able to look for previously identified features from the previous medical image in the current medical image, and compare these features to determine development over time, such as growth of an abnormality or effectiveness of treatment. In an embodiment, the previous medical image may be registered with the current medical image so that features from the previous medical image may be overlaid on the current medical image, again, enhancing the user's ability to identify and compare the same features over time.

In block S215, a radiology report regarding the subject is retrieved from a reporting database, such as a PACS database (e.g., PACS database 112) or an RIS database (e.g., RIS database 114) (e.g., by previous radiology report module 143). The radiology report is previously prepared by a user reviewing the one or more previous medical images of the subject, e.g., including the previous medical image from block S213. The radiology report includes medical descriptive text describing the findings and impression sections, made by the user in reporting the previous medical images, including identification of abnormalities and description of trends over time, if any. In block S216, relevant portions of the radiology report (e.g., impressions section) are identified and displayed (e.g., by NLP module 146) in order to emphasize information to the user that may be helpful in analyzing the current medical image. For example, a specific anomaly previously identified and described in the descriptive text may be extracted and displayed overlaying the current medical image, so that the user is prompted to check for the same anomalies, for example, to compare progression of the anomaly or treatment of the same.

More particularly, in block S216, the descriptive text from the radiology report is identified, and relevant clinical findings are extracted using a known NLP algorithm and deep learning techniques. The relevant clinical findings are stored and/or displayed on the display with the current medical image. The NLP algorithm parses the descriptive text in the report to identify key words and key phrases indicative of the relevant findings, which are extracted from the radiology report, using well known NLP and deep learning extraction techniques. The NLP and deep learning extraction may be performed automatically, without explicit inputs from the user who is reviewing the current medical image. The relevant clinical findings may be displayed in tabular form, for example.

Generally, with regard to the NLP algorithm, relevant data from the text can be extracted by applying domain-specific contextual embeddings, such as Bio+Clinical BERT, for example, for successful diagnoses extraction from radiology reports. The NLP algorithm may be contained in a pipeline which also contains a rules-based section splitter to split the radiology report into sections followed by sentence parsers that split the Findings and Impressions sections of the radiology report into sentences. A pretrained Bio+Clinical BERT model may be applied for the task of extraction of clinical phrases from the parsed sentences, and these clinical phrases may then be displayed to the user. Past image segmentation using the deep learning models, such as a U-Net model, to demarcate areas of interest may be integrated with the output of the NLP pipeline to create a complete picture of insights from previous medical images and corresponding radiology reports.

Referring to FIG. 3, the GUI 301 includes a previous report section 340 that displays the relevant findings identified in and extracted from the radiology report using the NLP pipeline. The previous report section 340 may include clinical diagnostic words and phrases, exact quotes from the radiology report, and/or a summary of the language that has been extracted, for example. In an embodiment, the previous report section 340 may include a check box, for example, that may be checked by the user to acknowledge that the displayed information has been read and considered.

In block S217 of FIG. 2, an interactive checklist is implemented by retrieving the interactive checklist from a checklist database, and displaying it on the display along with the current medical image (e.g., by interactive checklist module 147). The interactive checklist is selectable from multiple available interactive checklists stored in a checklist database (e.g., checklist database 118), each of which may be created from literature and/or clinical data, and is customizable. The interactive checklist may include multiple items for the user to consider in reading the current medical image, such as lists of possible diagnoses and misdiagnoses for the type of study being read, in order to help reduce under-reading errors in radiology diagnosis. For example, the interactive checklist may list items to be viewed and analyzed specific to chest examination (as shown in FIG. 3), such as lobar consolidation, diffuse consolidation, multifocal ill-defined consolidations, reticular interstitial opacities, fine nodule interstitial opacities, solitary pulmonary nodule and multiple masses, for example. In an embodiment, the user is able to check off items on the checklist via the GUI to indicate completion.

Also, the interactive checklist is bidirectional in that it is modifiable by the user via the GUI, enabling the user to add one or more items to the interactive checklist to assist in reading medical images in future studies. To this end, the modified interactive checklist may be stored in the checklist database, and may be retrievable by the particular user who made the modifications and/or by all users able to access the system. Likewise, the user may create new interactive checklists. In an embodiment, the user is prevented from removing existing items from the interactive checklist to assure a minimum level of medical image review. Of course, items may be removed from the interactive checklist at an administrative level, assure that all users receive the same checklist, when necessary.

Referring to FIG. 3, the GUI 301 includes interactive checklist 350, which is displayed along with the current medical image 310. The interactive checklist 350 provides line items corresponding to the items to be considered by the user, and associated check boxes that are physical checked by the user via the GUI 301 upon completion of each of the line items. In an embodiment, the user is able to choose an interactive checklist a dropdown menu (not shown) on the GUI 301.

In block S218 of FIG. 2, eye movement of the user is tracked (e.g., by eye tracking module 148), and the results of the eye tracking may be displayed for the user to adjust behavior, if necessary. Tracking the eye movement of the user may be performed using a camera (e.g., camera 129), such as a video camera, directed toward the user's face. The images captured by the camera are analyzed using well known eye tracking techniques to determine the direction of the user's gaze, both toward the display and away from the display, during the image reading process. The tracked eye movement may then be used to identify areas of high focus and low focus when the user is viewing the current medical image, for example. Weak spots in medical image perception by the user are determined based on the identified areas of high focus and low focus, and brought to the user's attention through eye tracking alerts. In addition, the identified weak spots in medical image perception may be presented to the user on the display as scan-paths that show covered and missed areas, as scan patterns and/or as a measure of duration of distraction and idling. The tracked eye movement may also be used to determine user distraction, particularly by determining instances and duration of each instance of the user looking away from the display while reading an image, as discussed below.

In an embodiment, at least one eye tracking alert may be displayed based on the determined weak spots in the user's medical image perception and/or the scan-paths in order to alert the user to areas of the current medical image on which the users insufficiently focused, thereby improving performance and reducing under-reading of the current medical image. For example, referring to FIG. 3, a low focus region 370 corresponding to an area of low focus may be presented or visually highlighted on the GUI 301 to draw the use's attention. In the depicted embodiment, the low focus region 370 is surrounded by a dashed box 375 to direct the user to look in the direction of the low focus region 370. The dashed box 375 may be shown in various colors and/or may flash in a manner that draws the user's attention. In alternative embodiments, the low focus region 370 may be highlighted by changing characteristics of the current medical image 310, itself. For example, a portion of the current medical image 310 corresponding to the low focus region 370 may be temporarily magnified or a flash or a flicker on the portion of the screen to draw the user's gaze. Alternatively, or in addition, the GUI 201 may display text, e.g., in an alert box (not shown), describing in words the portions of the current medical image 310 identified as an area of low focus.

In block S219, a level of distraction of the user is determined, and an alert is provided to the user when the level of distraction exceeds a predetermined threshold (e.g., by user distraction module 149). In an embodiment, a distraction report may be generated identifying how long the level of distraction exceeded the predetermined threshold, which may be stored and/or displayed to the user. The level of distraction may be determined based on a number of factors, such as determining the likely level of fatigue being experienced by the user and/or the direction of the user's gaze.

With regard to user fatigue, determining the level of distraction includes retrieving scheduling data from a scheduling database, and determining the duration of the user's shift, the amount of time into the shift the user has been working, the time of the day, and how many hours the user has been working on previous shifts based on login data and work schedules from the retrieved data. Generally, fatigue is expected to set in later in the user's shift after several days of work, as well as later in the day. Therefore, the level of distraction changes directly proportionally with the time duration, the time into the shift, the time of day, and the number of consecutive days the user has worked. So, for example, the longer the user has been working in current the shift, the more distracted the user is likely to be. Determining the level of distraction may also include calculating the amount of time the user takes to read the current medical image, where the level of distraction changes directly proportionally to the amount of time taken to read the current medical image. That is, the longer the user takes to read the current medical image, the more distracted the user is likely to be. Calculating the amount of time taken by the user to read the current medical image may include determining a first time between opening and closing the current medical image as displayed on the GUI, and determining a second time between beginning and ending dictation regarding the current medical image.

The alert to the user regarding the heightened level of distraction may be provided in any of various forms, without departing from the scope of the present teachings. For example, a visual symbol, such as alert symbol 360 shown in FIG. 3, may be displayed on the GUI 301 when the level of distraction exceeds the predetermined threshold, and not displayed when the level of distraction is below the predetermined threshold. Or, the visual alert symbol may be displayed in different colors, depending on whether the predetermined threshold has been exceeded, where green indicates no or an acceptable level of distraction, and red indicates an excessive level of distraction. In an alternative embodiment, the level of distraction is indicated as a continuum corresponding to the determined level of distraction, such as a virtual meter, or changing colors.

With regard to the user's gaze, determining the level of distraction based on the eye tracking performed in block S218 while the user is reading the current medical image during the study in order to identify idling by the user, which is the time the user looks away from the current medical image and/or from the display. The user may look away in response to common interruptions, such as going to another monitor to access an electronic medical record (EMR) to get clinical data, attending to phone calls from technologists or referrers, for example. Based on the tracking of the user's eye movement, the number of times the user looks away from the display, and the length of each of these times, may be determined. When the number of times the user looks away and/or amount of time the user not looking at the display exceed corresponding thresholds, an eye tracking alert is provided to the user, such as the alert symbol 365 shown in FIG. 3 or a similar alert. Or, the same alert symbol 360 may be used for eye tracking alerts. For example, when the user's eye movement indicates that user looks away from the display more than two times in a minute, for retrieving a text message or a quick phone call, for example, a distraction alert is provided on the display. Also, when the user's eye movement indicates that user looks away from the display for greater than 45 seconds, which is the average time for an in-person interruption from technologist/referrer OR looking into another monitor for EMR access, the distraction alert is provided on the display.

In addition, the areas of high focus and low focus determined from the eye tracking may also be used to determine a distraction pattern. For example, the entirety of the displayed current medical image may be divided into sectors or predetermined size, and a level of distraction (e.g., high, low, or medium focus) is identified for each sector, creating the distraction pattern. In this case, the level of distraction of the user is a function of the distraction pattern. The eye movement tracking enables coverage of well documented, radiologist reported, common blind spots and commonly overlooked areas in an image that hinder image interpretation, such as lung apices, edges and corners of radiographs, and musculoskeletal pathologic abnormalities, which are frequently under-read on chest radiographs, for example.

In block S220, a service level agreement (SLA) is implemented by retrieving the SLA from a personnel database (e.g., by SLA module 144), analyzing relevant information from the SLA regarding users. For example, the SLA may be used to initially match the imaging study to the user based at least in part on a specialty of the user indicated in the SLA, and assign or prioritize cases by urgency accordingly. For example, the user may log onto the GUI to begin reading. Based on the log-in information (e.g., user ID, employee identification number), the corresponding SLA is retrieved from the personnel database and analyzed to determine which imaging studies match with the user. Then, the current medical images corresponding to these imaging studies are automatically retrieved and presented to the user.

The order of the various steps shown in FIG. 2 is provided for the sake of illustration, and may be altered without departing from the scope of the present teachings. All of the steps as followed by the user may be logged in memory for future reference.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Although facilitating the reading of medical images has been described with reference to several exemplary embodiments, it is understood that the words that have been used are words of description and illustration, rather than words of limitation. Changes may be made within the purview of the appended claims, as presently stated and as amended, without departing from the scope and spirit of interventional procedure optimization in its aspects. Although facilitating the reading of medical images has been described with reference to particular means, materials and embodiments, facilitating the reading of medical images is not intended to be limited to the particulars disclosed; rather facilitating the reading of medical images extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A method of facilitating reading by a user of medical images displayed on a display including a graphical user interface (GUI), the method comprising:
receiving a current medical image of a subject, and displaying the current medical image on the display for the user to perform an image reading;

performing image segmentation of the current medical image using a deep learning algorithm to identify at least one region of interest, and displaying at least one annotation on the current medical image indicating the at least one region of interest on the display;

retrieving a previous medical image of the subject from a picture archiving and communication system (PACS) database;

retrieving a radiology report from the PACS database or a radiology information system (RIS) database regarding the subject, the radiology report comprising descriptive text;

performing image segmentation on the previous medical image using the deep learning algorithm to extract relevant findings, and displaying the relevant findings on the display with the current medical image;

performing natural language processing (NLP) on the descriptive text using a using word embedding technology to extract relevant findings, and displaying the relevant findings on the display with the current medical image;

retrieving an interactive checklist from a checklist database, the interactive checklist comprising a plurality of items for the user to consider when reviewing the current medical image, and displaying the interactive checklist on the display with the current medical image, wherein the interactive checklist is modifiable by the user via the GUI for adding one or more items to the interactive checklist while preventing removal of existing items from the interactive checklist; and determining a level of distraction of the user, and providing an alert to the user when the level of distraction exceeds a predetermined threshold, and generating a report identifying how long the level of distraction exceeds the predetermined threshold.

2. The method of claim 1, wherein determining the level of distraction of the user comprises:

retrieving schedule data from a scheduling database regarding the schedule of the user, and determining a time duration the user has been working, wherein the level of distraction changes proportionally to the time duration the user has been working; and calculating an amount of time taken to read the current medical image, wherein the level of distraction changes proportionally to the amount of time taken to read the current medical image, wherein calculating the amount of time taken to read the current medical image comprises determining a first time between opening and closing the current medical image and a second time between beginning and ending dictation regarding the current medical image.

3. The method of claim 1, further comprising:

tracking eye movement of the user while reading the current medical image;

identifying areas of high focus and low focus based on the tracked eye movement; and implementing at least one eye tracking alert on the display based on the identified areas of low focus to improve performance and to reduce under-reading.

4. The method of claim 3, wherein the at least one eye tracking alert is presented on the display as scan-paths that show covered and missed areas, as scan patterns or as a measure of duration of distraction and idling.

5. The method of claim 3, wherein determining the level of distraction of the user further comprises:

determining a number of times the user looks away from the display and a length of each of the times the user looks away based on the tracked eye movement of the user, and implementing at least one eye tracking alert on the display when the number of times the user looks away or the lengths of time the user looks away exceed corresponding thresholds.

6. The method of claim 3, wherein determining the level of distraction of the user further comprises:

determining a distraction pattern based on the tracked eye movement, wherein the level of distraction of the user is a function of the distraction pattern.

7. The method of claim 1, further comprising:

retrieving a service level agreement from a personal database, and initially matching the current medical image to the user based at least in part on a specialty of the user indicated in the service level agreement.

8. The method of claim 1, wherein the image segmentation of the current medical image comprises a U-Net model.

9. The method of claim 1, wherein the word embedding technology of the NLP pipeline comprises Bio+Clinical BERT.

10. A system for facilitating reading by a user of medical images, the system comprising:

a display comprising a graphical user interface (GUI) for interfacing with a user;

a processor in communication with the display; and a non-transitory memory that stores instructions that, when executed by the processor, cause the processor to:

receive a current medical image of a subject and cause the current medical image to be displayed on the display for the user to perform an image reading;

perform image segmentation of the current medical image using a deep learning algorithm to identify at least one region of interest, and cause at least one annotation to be displayed on the current medical image indicating the at least one region of interest on the display;

retrieve a previous medical image of the subject from a picture archiving and communication system (PACS) database;

retrieve a radiology report from the PACS database or a radiology information system (RIS) database regarding the subject, the radiology report comprising descriptive text;

perform image segmentation on the previous medical image using the deep learning algorithm to extract relevant findings, and to cause the relevant findings to be displayed on the display with the current medical image;

perform natural language processing (NLP) on the descriptive text using a word embedding technology to extract relevant findings, and cause the relevant findings to be displayed on the display with the current medical image;

retrieve an interactive checklist from a checklist database, the interactive checklist comprising a plurality of items for the user to consider when reviewing the current medical image, and cause the interactive checklist to be displayed on the display with the current medical image, wherein the interactive checklist is modifiable by the user via the GUI for adding one or more items to the interactive checklist while preventing removal of existing items from the interactive checklist.

11. The system of claim 10, further comprising a camera in communication with the processor, and configured to capture eye movements of the user to determine a gaze of the user in relation to the display while reading the current medical image,
wherein the instructions further cause the processor to:
identify areas of high focus and low focus based on the tracked eye movement; and
implement at least one eye tracking alert on the display based on the identified areas of low focus to improve performance and to reduce under-reading.

12. The system of claim 11, wherein the at least one eye tracking alert is presented on the display as scan-paths that show covered and missed areas, as scan patterns or as a measure of duration of distraction and idling.

13. The system of claim 11, wherein the instructions further cause the processor to:
determine a level of distraction of the user;
provide an alert to the user when the level of distraction exceeds a predetermined threshold; and
generate a report identifying how long the level of distraction exceeds the predetermined threshold.

14. The system of claim 13, wherein determining the level of distraction of the user comprises:
retrieving schedule data from a scheduling database regarding the schedule of the user;
determining a time duration the user has been working, wherein the level of distraction changes proportionally to the time duration the user has been working; and
calculating an amount of time taken to read the current medical image, wherein the level of distraction changes proportionally to the amount of time taken to read the current medical image.

15. The system of claim 13, wherein determining the level of distraction of the user further comprises:
determining a number of times the user looks away from the display and a length of each of the times the user looks away based on the tracked eye movement of the user, and
implementing at least one eye tracking alert on the display when the number of times the user looks away or the lengths of time the user looks away exceed corresponding thresholds.

16. The system of claim 13, wherein determining the level of distraction of the user further comprises:
determining a distraction pattern based on the tracked eye movement, wherein the level of distraction of the user is a function of the distraction pattern.

17. The system of claim 10, wherein the instructions further cause the processor to:
retrieve a service level agreement from a personal database, and
initially match the current medical image to the user based at least in part on a specialty of the user indicated in the service level agreement.

18. The system of claim 10, wherein the image segmentation of the current medical image comprises a U-Net model, and
wherein the word embedding technology of the NPL pipeline comprises Bio+Clinical BERT.

19. The system of claim 10 wherein the current image is retrieved from the PACS database.

20. The system of claim 10, wherein the current image is retrieved from an imaging device imaging the subject.

* * * * *